United States Patent
Huang et al.

(10) Patent No.: US 8,576,158 B2
(45) Date of Patent: Nov. 5, 2013

(54) CONTRAST RATIO PROMOTION METHOD

(75) Inventors: Wen Cheng Huang, Taoyuan County (TW); Lu Hao Chen, Taipei County (TW); Sung Yu Tsai, Kaohsiung County (TW); Chang Chen Chien, Taipei County (TW)

(73) Assignee: Hannstar Display Corporation, New Taipei (TW)

( * ) Notice: Subject to any disclaimer, the term of this patent is extended or adjusted under 35 U.S.C. 154(b) by 1017 days.

(21) Appl. No.: 12/370,108

(22) Filed: Feb. 12, 2009

(65) Prior Publication Data

US 2009/0207127 A1    Aug. 20, 2009

(30) Foreign Application Priority Data

Feb. 19, 2008   (TW) ................ 97105820 A

(51) Int. Cl.
*G09G 3/36* (2006.01)

(52) U.S. Cl.
USPC ........................................ 345/102

(58) Field of Classification Search
None
See application file for complete search history.

(56) References Cited

U.S. PATENT DOCUMENTS

| | | | |
|---|---|---|---|
| 4,752,771 A | 6/1988 | Katogi et al. | |
| 2001/0008395 A1* | 7/2001 | Yamamoto et al. | 345/102 |
| 2003/0201968 A1 | 10/2003 | Itoh et al. | |
| 2007/0046829 A1 | 3/2007 | Su et al. | |
| 2008/0122833 A1* | 5/2008 | Choe | 345/214 |

FOREIGN PATENT DOCUMENTS

| | | |
|---|---|---|
| CN | 1215198 | 4/1999 |
| CN | 1462425 | 12/2003 |
| CN | 1892793 | 1/2007 |
| CN | 101149902 | 3/2008 |
| WO | 2008004799 | 1/2008 |

OTHER PUBLICATIONS

Apr. 6, 2011 Office Action from Co-Pending Chinese Patent Application.

* cited by examiner

Primary Examiner — Nicholas Lee
(74) Attorney, Agent, or Firm — Jianq Chyun IP Office

(57) ABSTRACT

A contrast ratio promotion method for a display device is provided. The display device contains a back light module having a brightness and has a maximum luminance. The contrast ratio promotion method comprises the steps of continuously receiving a picture signal during each unit time, continuously calculating a ratio of a luminance of a picture corresponding to the picture signal to the maximum luminance, where the ratio is defined as an instant relative luminance, setting a first ratio, a first buffer time and a first adjusting time, and gradually reducing the brightness of the back light module to a minimum brightness during the first adjusting time when a first cumulated time for the respective consecutive plural instant relative luminances being smaller than the first ratio is longer than the first buffer time.

10 Claims, 4 Drawing Sheets

CONTRAST RATIO PROMOTION METHOD

FIELD OF THE INVENTION

The present invention relates to a contrast ratio promotion method for a display, and more particularly to a contrast ratio promotion method for a liquid crystal display.

BACKGROUND OF THE INVENTION

Recently the technologies of the liquid crystal displays have been advanced and improved quickly. Moreover, the production cost of the liquid crystal displays is continuously reduced. Therefore, the traditional cathode ray tubes (CRT) are almost completely replaced by the liquid crystal displays (LCD) in the market of the monitors. As the technologies of LCD are being improved greatly, the market of LCD TV is growing fast, and the requirements and expectations for the performance of the LCD TV become higher and higher. Compared to the traditional CRT TV, the LCD TV has several advantages, such as much thinner dimension, lager screen size, much higher resolutions, etc. However, the LCD TC has its weakness, e.g. lower contrast ratio. Since the back light of the LCD TV is continuously turned on, nevertheless the light can hardly be blocked by the liquid crystal completely in the dark pictures due to the characteristics of the liquid crystal, and the resulted slight light leaking, for which the contrast ratio is reduced, occurs. Therefore the promotion of the contrast ratio becomes one of the important LCD techniques needed to be improved.

In order to promote the contrast ratio, as usual, the current technology instantly adjusts the brightness of the back light module according to the total luminance of the displayed picture. For example, when the total luminance of the picture to be displayed is low, the brightness of the back light module is instantly decreased; when the total luminance of the picture to be displayed is high, the brightness of the back light module is instantly increased. However, this method can easily cause the picture flickering and the displayed pictures to be suddenly darkening and lightening, which may make the audience uncomfortable and cause the vision fatigue. Meanwhile, the quickly and frequently adjusting the brightness of the back light module may reduce the lifetime of the back light module. On the other hand, though the reduction of the brightness of the back light module can increase the contrast ratio, the whole picture may look dim.

In order to solve the above-mentioned problems, the new concepts and the solutions are proposed in the present invention in order to promote the contrast ratio of the LCD and to effectively solve the problems of the picture flickering and the visual discomfort. The present invention is described below.

SUMMARY OF THE INVENTION

The present invention provides a contrast ratio promotion method for LCD devices to promote the contrast ratio of the LCD device without flickering.

In accordance with one aspect of the present invention, a contrast ratio promotion method for a display device is provided. The display device contains a back light module having a brightness and has a maximum luminance. The contrast ratio promotion method comprises the steps of continuously receiving a picture signal during each unit time, continuously calculating a ratio of a luminance of a picture corresponding to the picture signal to the maximum luminance, where the ratio is defined as an instant relative luminance, setting a first ratio, a first buffer time and a first adjusting time, and gradually reducing the brightness of the back light module to a minimum brightness during the first adjusting time when a first cumulated time for the respective consecutive plural instant relative luminances being smaller than the first ratio is longer than the first buffer time.

Preferably, the contrast ratio promotion method further comprises the steps of setting a second ratio, a second buffer time and a second adjusting time, and gradually increasing the brightness of the back light module to a maximum brightness during the second adjusting time when a second cumulated time for the plural instant relative luminances being consecutively larger than the second ratio is longer than the second buffer time.

Preferably, the display device comprises plural pixels, the maximum luminance is a first summation of a highest grey value of each the pixel, and the instant relative luminance is obtained by dividing a second summation of a grey value of each the pixel in the picture by the maximum luminance.

Preferably, the display device comprises plural pixels, and when the brightness of the back light module is gradually reduced to the minimum brightness during the first adjusting time, an original grey value of each the pixel is gradually adjusted to a compensated grey value.

Preferably, the compensated grey value of each the pixel is gradually adjusted back to the original grey value, when the brightness of the back light module is gradually increased to the maximum brightness during the second adjusting time.

Preferably, the first ratio is in a range of 8 to 12%, and the second ratio is in a range of 17 to 25%.

Preferably, the first buffer time is in the range of 2 to 5 seconds, and the second buffer time is shorter than 3 seconds.

In accordance with another aspect of the present invention, a contrast ratio promotion method is provided. The display device contains a back light module having a brightness and has a maximum luminance. Th e contrast ratio promotion method comprises the steps of receiving a picture signal, calculating a ratio of a luminance of a picture corresponding to the picture signal to the maximum luminance, where the ratio is defined as an instant relative luminance, setting a first ratio and a first adjusting time, and gradually reducing a brightness of the back light module to a minimum brightness during the first adjusting time when the instant relative luminance is smaller than the first ratio.

Preferably, the contrast ratio promotion method further comprises the steps of setting a second ratio and a second adjusting time, and gradually increasing the brightness of the back light module to a maximum brightness during the second adjusting time when the instant relative luminance is larger than the second ratio.

Preferably, the display device includes plural pixels, the maximum luminance is a first summation of a maximum grey value of each the pixel, and the instant relative luminance is obtained by dividing a second summation of a grey value of each the pixel in the picture by the maximum luminance.

Preferably, the display device includes plural pixels, and when the brightness of the back light module is gradually reduced to the minimum brightness during the first adjusting time, an original grey value of each the pixel is gradually adjusted to a compensated grey value.

Preferably, the compensated grey value of each the pixel is gradually adjusted back to the original grey value when the brightness of the back light module is gradually increased to the maximum brightness during the second adjusting time.

Preferably, the first ratio is in a range of 8 to 12%.

Preferably, the first adjusting time is longer than 5 seconds, and the second adjusting time is longer than 2 seconds.

Preferably, the second ratio is in a range of 17 to 25%.

In accordance with a further aspect of the present invention, a display device is provided. The display device comprises a receiving element receiving a picture signal, a calculating element calculating a luminance ratio of a luminance of the picture signal to a maximum luminance of the display device, a back light module, and a control element adjusting a brightness of the back light module according to a quantitative relation between the luminance ratio and a predetermined value.

Preferably, the predetermined value comprises a first and a second predetermined values, the control element decreases the brightness of the back light module when the luminance ratio is smaller than the first predetermined value, and the control element increases the brightness of the back light module when the luminance ratio is larger than the second predetermined value.

Preferably, the control element sets a first and a second adjusting times, the control element gradually decreases the brightness of the back light module during the first adjusting time when the luminance ratio is smaller than the first predetermined value, and the control element gradually increases the brightness of the back light module during the second adjusting time when the luminance ratio is larger than the second predetermined value.

Preferably, the control element sets a first and a second buffer times, the control element decreases the brightness of the back light module when the luminance ratio is always smaller than the first predetermined value during the first buffer time, and the control element increases the brightness of the back light module when the luminance ratio is always larger than the second predetermined value during the second buffer time.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

First Embodiment

Figure 1:
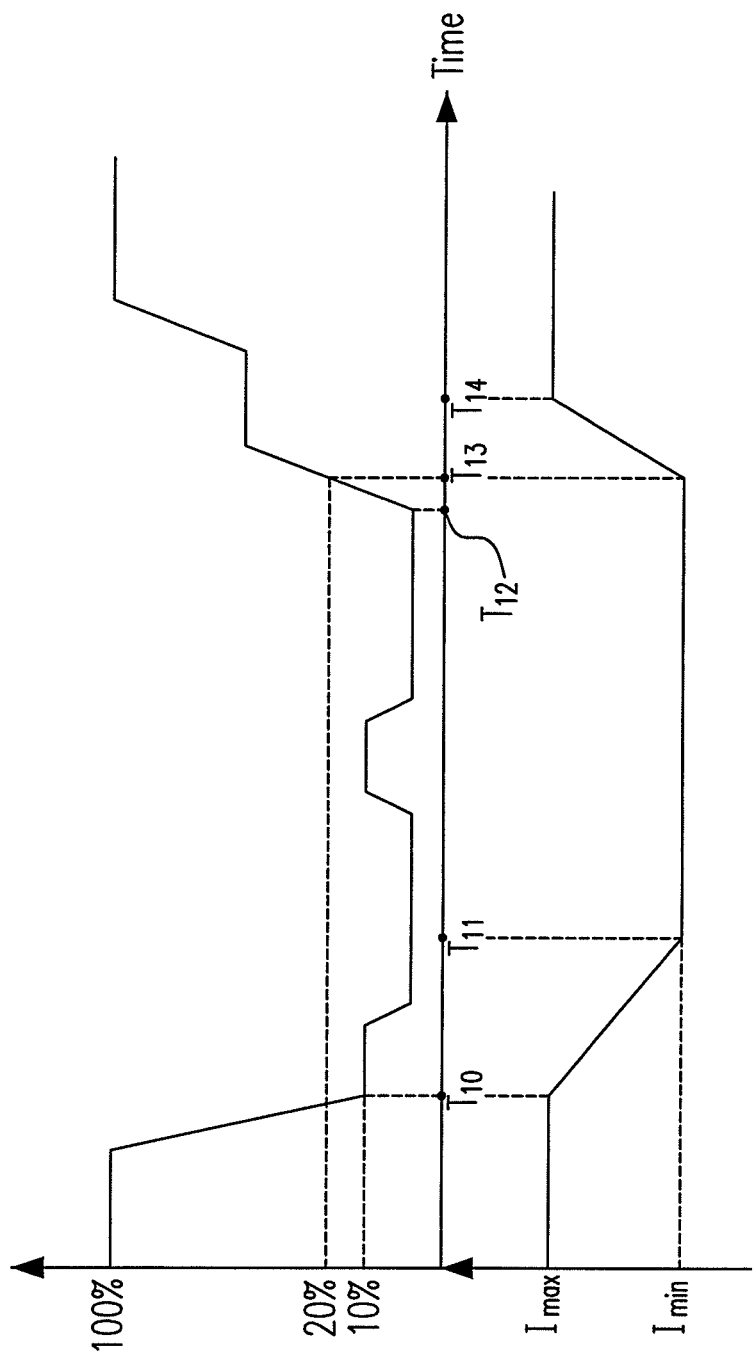
FIG. 1 is the schematic diagram showing the adjusting processes for the brightness of the back light module according to the first embodiment of the present invention.

Please refer to FIG. 1, which is the schematic diagram showing the adjusting processes for the brightness of the back light module according to the first embodiment of the present invention. Generally speaking, there are 60 pictures per second displayed in the LCD TV. Therefore, a new picture is display every 1/60 second. Please refer to FIG. 1. The abscissa represents time passing. The upper part in the vertical coordinate represents each instant luminance ratio, defined as the ratio of the total luminance of each picture in each time point to the maximum luminance of the LCD TV, in each time point through time passing. The total luminance of each picture can be calculated from the inputted picture signals, which may come from the DVD player, the blue ray disk player, the coaxial TV cable, the hard disk or the memory stick with image files, or even the optical fiber connected to the internet.

The maximum luminance can be calculated by multiplying the maximum grey value by the total pixels, including sub-pixels, of the LCD TV (LCD monitor). For instance, when the grey values are divided into 256 levels, i.e. 8 bits, the $0^{th}$ level corresponds to the darkest condition and the $255^{th}$ level corresponds to the brightest condition. When an LCD TV contains 2 million pixels, each of which includes three sub-pixels for red, green and blue basic colors, then the maximum luminance is obtained by the equation of 255×2,000,000×3=1,530,000,000. For another example, when the grey values are divided into 1024 levels, i.e. 10 bits, the $0^{th}$ level corresponds to the darkest condition and the $1023^{th}$ level corresponds to the brightest condition. When an LCD TV contains 2 million pixels, then the maximum luminance is obtained by the equation of 1023×2,000,000×3=6,138,000,000. On the other hand, the luminance of a picture can be calculated as a summation of the grey value of each sub-pixel in the picture. Finally, the instant relative luminance is a ratio of the luminance of the picture to the maximum luminance.

Of course, the weight method can be adopted and combined into the above calculation method for the instant relative luminance. For instance, the grey values in some specific range can be multiplied by the weighting factors, or the weighting factors for some color can be introduced. Moreover, the weight factors for some specific color and for the grey values in some specific range can be simultaneously introduced into the weighting calculation for the instant relative luminance.

Please refer to FIG. 1, wherein the upper part above the abscissa shows the instant relative luminance in each time point, and the lower part below the abscissa shows the adjusting process for the brightness of the back light module in each corresponding time point. When the time starts from zero in the abscissa, the instant relative luminance of the picture is 100%. As the time passes along, the instant relative luminance begins to decrease. When the time point of $T_{10}$ is reached, the instant relative luminance is reduced to be below a predetermined first ratio, 10%. Then the procedure of the reduction on the brightness of the back light module is initiated in this embodiment, and the brightness of the back light module is gradually decreased from the maximum brightness, $I_{max}$. When the time point, $T_{11}$, is reached, the brightness of the back light module is reduced to a minimum brightness, $I_{min}$. In this embodiment, the time interval from $T_{10}$ to $T_{11}$, i.e. the first adjusting time, is set to 9 seconds. This design of gradually reducing the brightness can avoid the sudden darkening of the picture, which the audience may perceive and feel uncomfortable for.

Figure 2:
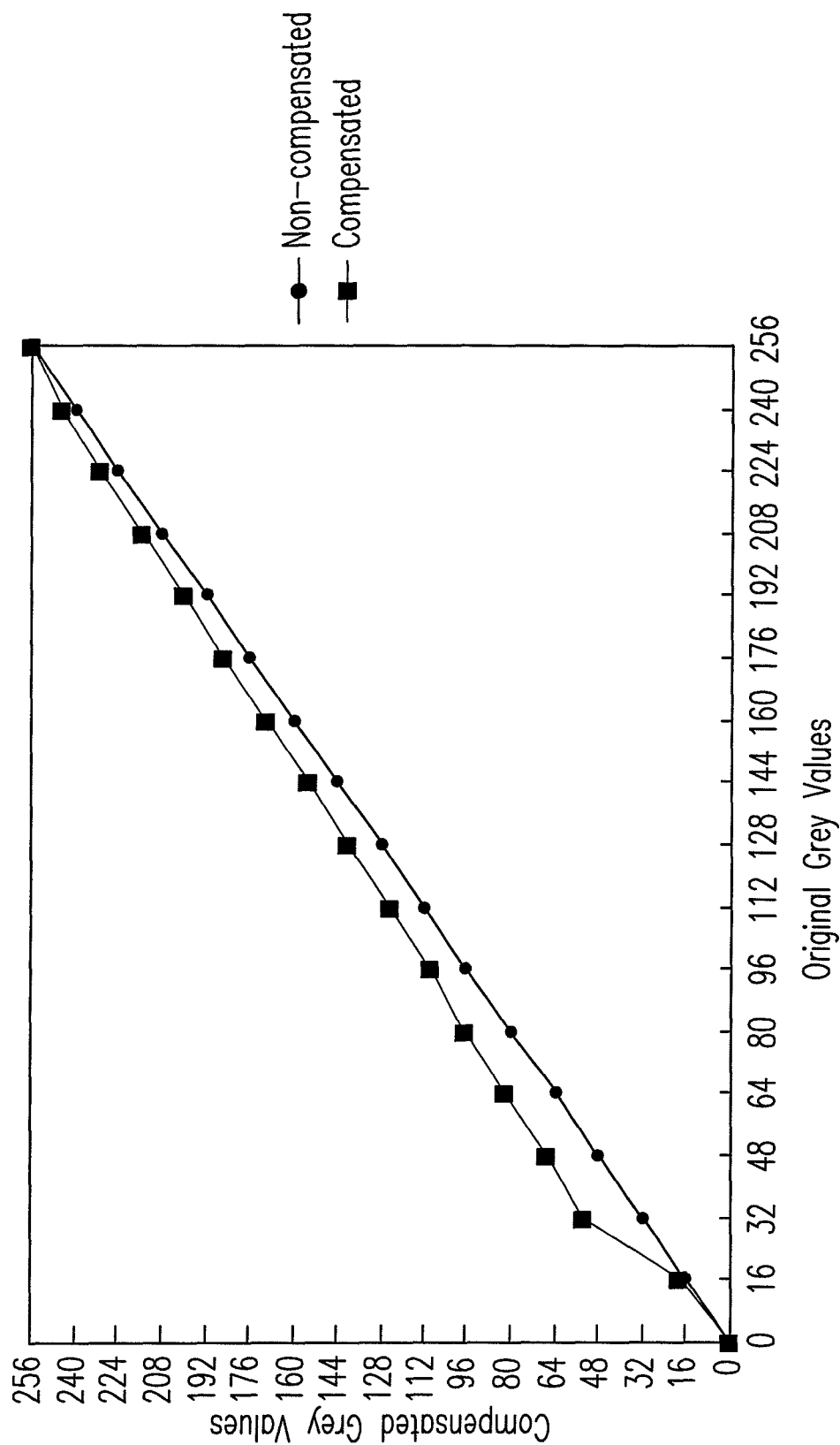
FIG. 2 is the schematic diagram showing the compensation curve of the grey values according to the present invention.

Please refer to FIG. 2, which is the schematic diagram showing the compensation curve of the grey values according to the present invention. In this invention, the maximum compensation on the grey value occurs at the grey value equal to 32, which may be tuned depending on several parameters related to liquid crystal types, TFT designs, spectra of the back light module, etc. In this invention, there is no compensation for the darkest and brightest conditions, and the relatively more compensation occurs at the grey values close to 32. This compensation on the grey values can prevent the pictures from looking dim and can reinforce the vividness of the pictures.

In this embodiment, when the brightness of the back light module is gradually reduced during the first adjusting time, i.e. from $T_{10}$ to $T_{11}$, the procedure of the introducing compensation on the grey values starts synchronously. That is, the original grey value of each pixel is gradually raised to the compensated grey value during the first adjusting time, i.e. from $T_{10}$ to $T_{11}$. Since the raising process proceeds gradually, therefore the audience can not perceive the sudden brightening of the pictures and accordingly does not have the uncomfortable feeling.

Please refer to FIG. 1 again. At the duration of $T_{10}$ to $T_{11}$, the instant relative luminance keeps below the predetermined first ratio, 10%, and therefore the brightness of the back light module remains at the minimum brightness, $I_{min}$. Starting at the time point, $T_{12}$, the instant relative luminance begins to raise and exceeds the predetermined second ratio, 20%, at the time point, $T_{13}$. At this moment, the procedure of raising the brightness of the back light module is initiated, and the brightness of the back light module is gradually increased from the minimum brightness, $I_{min}$. When the time point, $T_{14}$, is reached, the brightness of the back light module is increased to the maximum brightness, $I_{max}$. In this embodiment, the second adjusting time, i.e. from $T_{13}$ to $T_{14}$, is set to 2 seconds. Similarly, since the brightness increasing process proceeds gradually, therefore the audience can not perceive the sudden brightening of the pictures and accordingly does not have the harsh feeling to eyes.

In this embodiment, when the brightness of the back light module is gradually increased during the second adjusting time, i.e. from $T_{13}$, to $T_{14}$, the procedure of the releasing compensation on the grey values starts synchronously. That is, the compensated grey value of each pixel is gradually adjusted back to the corresponding original grey value during the second adjusting time, i.e. from $T_{13}$ to $T_{14}$, which is set to 2 seconds.

To sum up the above description for this embodiment, the instant relative luminance below 10% is set as an available domain for reducing the brightness of the back light module to the minimum brightness, $I_{min}$. The instant relative luminance in the range of 10% to 20% is set to a buffer domain, and when the instant relative luminance is increasing from 10%, the brightness of the back light module will not be raised from the minimum $I_{min}$, until the instant relative luminance exceeds 20%, in order to avoid adjusting the brightness of the back light module too often and influencing the lifetimes of the lamps of the back light module.

Second Embodiment

Figure 3:
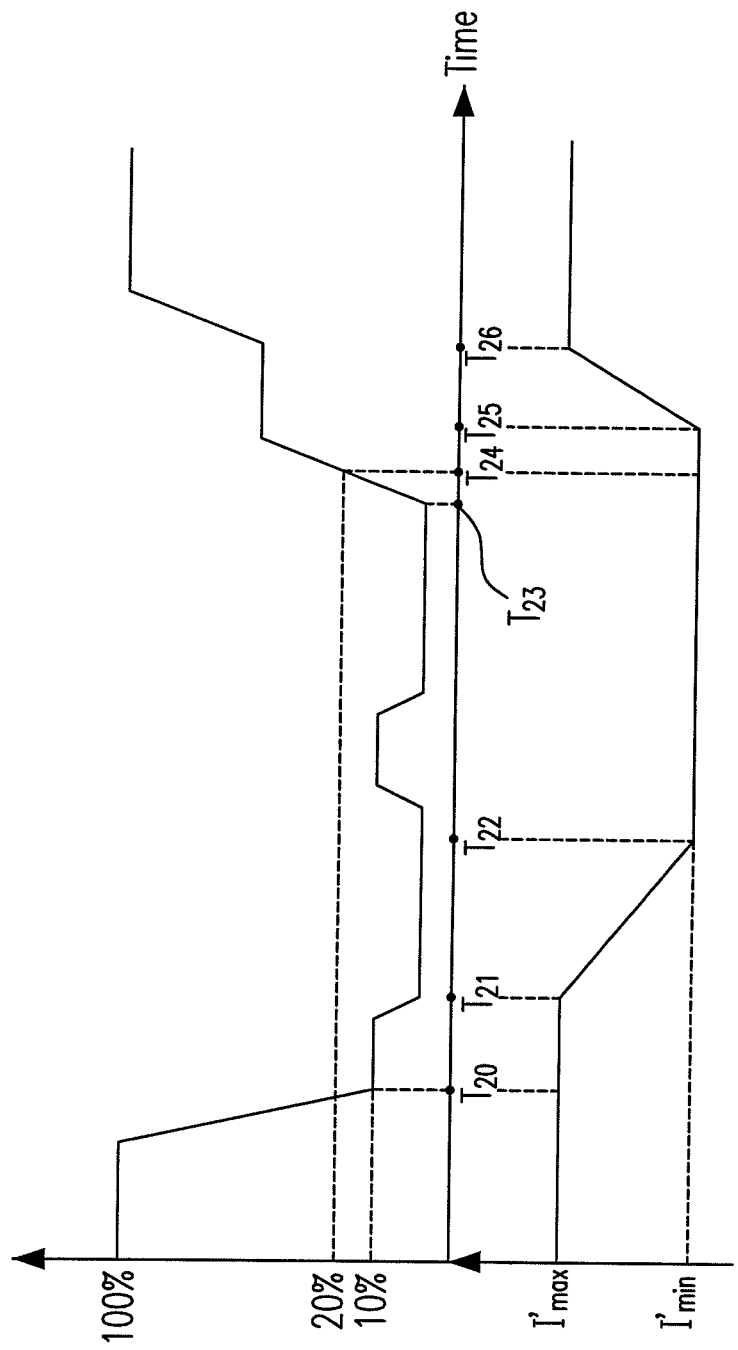
FIG. 3 is the schematic diagram showing the adjusting processes for the brightness of the back light module according to the second embodiment of the present invention.

FIG. 3 is the schematic diagram showing the adjusting processes for the brightness of the back light module according to the second embodiment of the present invention. In this embodiment, the instant relative luminance in each time point is identical to that in the first embodiment. That is, the completely same picture signals are inputted in this embodiment so as to facilitate the comparison of the adjusting methods between this embodiment and the first embodiment and to easily figure out the difference therebetween. In this embodiment, the concept of the buffer time is introduced to further avoid frequently starting the adjusting function on the brightness of the back light module. The detailed explanation is described below.

Please refer to FIG. 3. When the time starts from zero in the abscissa, the instant relative luminance of the picture is 100%. As the time passes along, the instant relative luminance begins to decrease. When the time point of $T_{20}$ is reached, the instant relative luminance is reduced to be below a predetermined first ratio, 10%. Then the counting time procedure starts in this embodiment. At the duration of $T_{20}$ to $T_{21}$, the cumulated time, when the instant relative luminance continuously keeps below 10%, reaches a predetermined first buffer time, e.g. 3 seconds. Then the adjusting function on the brightness of the back light module is initiated to gradually reduce the brightness of the back light module from the maximum brightness, $I'_{max}$. The brightness of the back light module is reduced to the minimum brightness, $I'_{min}$, at the time point, $T_{22}$.

In this embodiment, the duration of $T_{21}$ to $T_{22}$ is set to 9 seconds. This design of gradually reducing the brightness can avoid the sudden darkening of the picture, which the audience may feel uncomfortable from or can not clearly watch.

The same as the first embodiment, the compensation function on the grey values is introduced in this embodiment. Please refer to FIG. 2. When the brightness of the back light module is gradually reduced during the first adjusting time, i.e. from $T_{21}$ to $T_{22}$, the procedure of the introducing compensation on the grey values starts synchronously. That is, the original grey value of each pixel is gradually raised to the corresponding compensated grey value during the first adjusting time, i.e. from $T_{21}$ to $T_{22}$, which is set to 9 seconds. Since the raising process proceeds gradually, therefore the audience can not perceive the sudden brightening of the pictures and accordingly does not have the uncomfortable feeling. This compensation on the grey values can prevent the pictures from looking dim and can reinforce the vividness of the pictures.

Please continuously refer to FIG. 3. At the duration of $T_{22}$ to $T_{23}$, the instant relative luminance keeps below the predetermined first ratio, 10%, and therefore the brightness of the back light module remains at the minimum brightness, $I_{min}$. Starting at the time point, $T_{23}$, the instant relative luminance begins to raise and exceeds the predetermined second ratio, 20%, at the time point, $T_{24}$. At this moment, the counting time function is initiated. At the duration of $T_{24}$ to $T_{25}$, the cumulated time, when the instant relative luminance continuously keeps above 20%, reaches a predetermined second buffer time, e.g. 0.5 seconds. Then the adjusting function on the brightness of the back light module is initiated to gradually raise the brightness of the back light module from the minimum brightness, $I'_{min}$. The brightness of the back light module is raised to the maximum brightness, $I'_{max}$, at the time point, $T_{26}$.

In this embodiment, the second adjusting time, i.e. from $T_{25}$ to $T_{26}$, is set to 2 seconds. Similarly, since the brightness increasing process proceeds gradually, therefore the audience can not perceive the sudden brightening of the pictures and accordingly does not have the harsh feeling to eyes.

At the duration of $T_{25}$ to $T_{26}$, when the brightness of the back light module is gradually raised, the similar procedure of the releasing compensation on the grey values proceeds in this embodiment, which is the same as that in the first embodiment. The method of gradual reduction on the grey values is also used. The detailed contents are not repeated here.

Third Embodiment

Figure 4:
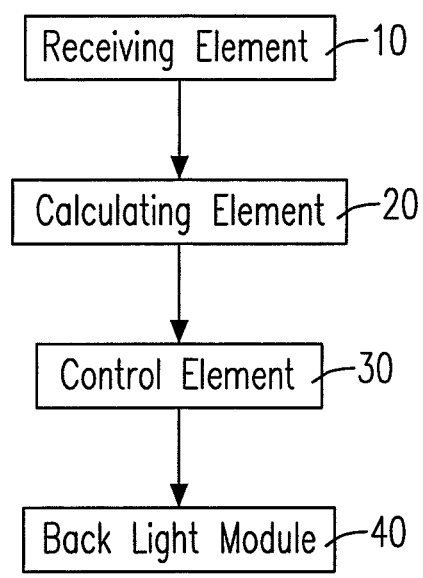
FIG. 4 is the schematic diagram showing the display device according to the third embodiment of the present invention.

Please refer to FIG. 4, which is the schematic diagram showing the display device according to the third embodiment of the present invention. In this embodiment, a display device 1 with the effect of the promotion on the contrast ratio is provided. The display device 1 can be an LCD, e.g. LCD TV, or any other display device requiring a back light module. The display device 1 contains a receiving element 10, a calculating element 20, a control element 30 and a back light module 40.

The receiving element 10 can be used to receive the picture signals, which may come from the DVD player, the blue ray disk player, the coaxial TV cable, the hard disk or the memory stick with image files, or even the optical fiber connected to the internet.

The calculating element 20 can be an integrated circuit (IC) chip, and can be used to calculate the luminance of each picture, for which the signals are received by the receiving element 10, the maximum luminance of the display device 1 and the ratio of the luminance of the picture to the maximum luminance. The calculation method has been described in detail in the first embodiment. Please refer to the relevant part in the first embodiment.

The control element 30 can be an IC chip, and can adjust the brightness of the back light module 40 according to the result of comparing the ratio of the luminance of the picture to the maximum luminance calculated by the calculating element 20 with one or more predetermined ratios. The methods of the comparison and control can be the same as those in the first and second embodiments, such as gradually adjusting the brightness, the concept of introducing the buffer time, etc. Please refer to the first and the second embodiments for the details. In addition, the other methods rather than those described in the first and second embodiments can be adopted as the comparison and control methods for the control element 30.

In this embodiment, the calculating element 20 and the control element 30 can be designed as two discrete IC chips, be integrated into a single IC chip, or even be integrated with the IC chip for the back light module or other IC chips in the display device to form a system chip with multiple functions.

In this embodiment, the display device 1 can dynamically adjust the brightness of the back light module according to the real luminance of the pictures and has the capability of promoting the contrast ratio.

From the above description, the present invention provides the display device with high contrast ratio and the methods of the contrast ratio promotion, which can be applied to LCDs or other display devices with the back light modules. By calculating the picture luminances to adjust the brightness of the back light module, using the methods of gradually increasing and decreasing brightness, and the method of introducing the buffer time, the present invention can avoid the conditions of being harsh to eyes, the picture flickering, and adjusting the brightness of the back light module too often.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A contrast ratio promotion method for a display device, wherein the display device contains a back light module having a minimum brightness and a maximum brightness, and the display device has a maximum luminance, comprising steps of:
   receiving a picture signal;
   calculating a ratio of a luminance of a picture corresponding to the picture signal to the maximum luminance, wherein the ratio is defined as an instant relative luminance, the maximum luminance is determined by a total number of pixels of the display device and a pixel resolution related to each of the pixels, and the luminance of the picture is determined by grey values of each of the pixels in the picture;
   setting a first ratio and a first adjusting time; and
   gradually and linearly reducing a brightness of the back light module from the maximum brightness to the minimum brightness during the first adjusting time when the instant relative luminance is smaller than the first ratio.

2. The contrast ratio promotion method according to claim 1, further comprising steps of:
   setting a second ratio and a second adjusting time; and
   gradually and linearly increasing the brightness of the back light module from the minimum brightness to the maximum brightness during the second adjusting time when the instant relative luminance is larger than the second ratio.

3. The contrast ratio promotion method according to claim 1, wherein the maximum luminance is a first summation of maximum grey values of each of the pixels, and the instant relative luminance is obtained by dividing a second summation of the grey values of each of the pixels in the picture by the maximum luminance.

4. The contrast ratio promotion method according to claim 2, wherein when the brightness of the back light module is gradually and linearly reduced from the maximum brightness to the minimum brightness during the first adjusting time, an original grey value of each of the pixels is gradually increased to a compensated grey value.

5. The contrast ratio promotion method according to claim 4, wherein the compensated grey value of each of the pixels is gradually adjusted back to the original grey value when the brightness of the back light module is gradually and linearly increased from the minimum brightness to the maximum brightness during the second adjusting time.

6. The contrast ratio promotion method according to claim 1, wherein the first ratio is in a range of 8 to 12%.

7. The contrast ratio promotion method according to claim 2, wherein the first adjusting time is longer than 5 seconds, and the second adjusting time is longer than 2 seconds.

8. The contrast ratio promotion method according to claim 2, wherein the second ratio is in a range of 17 to 25%.

9. A display device comprising:
   a receiving element receiving a picture signal corresponding to a picture;
   a calculating element calculating a luminance ratio of a luminance of the picture to a maximum luminance of the display device, wherein the maximum luminance is determined by a total number of pixels of the display device and a pixel resolution related to each of the pixels, and the luminance of the picture is determined by grey values of each of the pixels in the picture;
   a back light module having a maximum brightness and a minimum brightness; and
   a control element adjusting a brightness of the back light module according to a quantitative relation between the luminance ratio and a predetermined value,
   wherein the predetermined value comprises a first and a second predetermined values, and the second predetermined value is greater than the first predetermined value,
   wherein the control element gradually and linearly decreases the brightness of the back light module from the maximum brightness to the minimum brightness when the luminance ratio is smaller than the first predetermined value,
   wherein the control element gradually and linearly increases the brightness of the back light module from the minimum brightness to the maximum brightness when the luminance ratio is larger than the second predetermined value.

10. The display device according to claim 9, wherein:

the control element sets a first and a second adjusting times, the control element gradually and linearly decreases the brightness of the back light module from the maximum brightness to the minimum brightness during the first adjusting time when the luminance ratio is smaller than the first predetermined value, and the control element gradually and linearly increases the brightness of the back light module from the minimum brightness to the maximum brightness during the second adjusting time when the luminance ratio is larger than the second predetermined value.

* * * * *